United States Patent
Farkash et al.

(10) Patent No.: US 11,017,077 B2
(45) Date of Patent: May 25, 2021

(54) RUN-TIME SECURITY PROTECTION SYSTEM AND METHOD

(71) Applicant: NXP USA, INC., Austin, TX (US)

(72) Inventors: Monica C. Farkash, Austin, TX (US); Jayanta Bhadra, Austin, TX (US); Sandip Ray, Austin, TX (US); Wen Chen, Austin, TX (US)

(73) Assignee: NXP USA, Inc., Austin, TX (US)

( * ) Notice: Subject to any disclaimer, the term of this patent is extended or adjusted under 35 U.S.C. 154(b) by 523 days.

(21) Appl. No.: 15/927,484

(22) Filed: Mar. 21, 2018

(65) Prior Publication Data
US 2019/0294785 A1    Sep. 26, 2019

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/55* | (2013.01) |
| *G06N 5/04* | (2006.01) |
| *G06N 20/00* | (2019.01) |

(52) U.S. Cl.
CPC ............ *G06F 21/554* (2013.01); *G06N 5/04* (2013.01); *G06N 20/00* (2019.01); *G06F 2221/034* (2013.01)

(58) Field of Classification Search
CPC ........ G06F 21/554; G06F 21/55; G06F 21/50; G06F 2221/034; G06F 21/725; G06N 20/00; G06N 5/04
See application file for complete search history.

(56) References Cited

U.S. PATENT DOCUMENTS

| | | | |
|---|---|---|---|
| 7,225,343 B1 * | 5/2007 | Honig | G06F 21/554 713/194 |
| 7,367,063 B1 * | 4/2008 | O'Toole, Jr. | G06F 21/554 713/183 |
| 7,620,989 B1 | 11/2009 | Couturier et al. | |

(Continued)

FOREIGN PATENT DOCUMENTS

CN          101968769 B       2/2011

OTHER PUBLICATIONS

Salas, Percy A. Pari et al. "Model-based Security Vulnerability Testing." Proceeding of the 2007 Australian Software Engineering Conference (ASWEC'07) 2007 IEEE pp. 1-10.

(Continued)

*Primary Examiner* — Amie C. Lin

(57) ABSTRACT

A security system for vetting run-time operation of device hardware. A model stores vetted states based on device hardware security signals, a severity level value and at least one vetted next state. The vetting system compares each state of the device hardware with the vetted next states of a current state, and provides an indication and a severity level when the real next state does not match a vetted next state. In response to the indication, the synchronization system performs synchronization by comparing each subsequent real next state of the device hardware with the vetted states until initial synchronization occurs when any subsequent real next state matches a vetted state. The learning system receives feedback from the device hardware in response to the indication, and when indicated by the feedback, updates the model in accordance with the feedback.

22 Claims, 8 Drawing Sheets

(56) References Cited

U.S. PATENT DOCUMENTS

| | | | |
|---|---|---|---|
| 8,321,437 | B2 | 11/2012 | Lim |
| 8,401,982 | B1 | 3/2013 | Satish et al. |
| 9,773,112 | B1* | 9/2017 | Rathor ................. G06F 21/554 |
| 2004/0034790 | A1 | 2/2004 | Aissi |
| 2006/0130146 | A1 | 6/2006 | Choi et al. |
| 2009/0328190 | A1 | 12/2009 | Liu et al. |
| 2013/0086261 | A1 | 4/2013 | Lim |
| 2014/0115396 | A1 | 4/2014 | Fournier et al. |
| 2016/0352771 | A1 | 12/2016 | Sivan et al. |
| 2017/0076116 | A1 | 3/2017 | Chen et al. |
| 2019/0278870 | A1* | 9/2019 | Novielli ................. G06N 20/00 |
| 2020/0036745 | A1* | 1/2020 | Yamada ................. G06F 21/55 |

OTHER PUBLICATIONS

Schieferdecker, Ina et al. "Model-Based Security Testing." Workshop on Model-Based Testing 2012 (MBT 2012) EPTCS 80, 2012. pp. 1-12.

Arora, Divya et al. "Hardware-Assisted Run-Time Monitoring for Secure Program Execution on Embedded Processors." IEEE Transaction on Very Large Scale Integration (VLSI) Systems, vol. 14, No. 12. Dec. 2006. pp. 1295-1308.

Deorio, Andrew et al. "Machine Learning-based Anomaly Detection for Post-silicon Bug Diagnosis." Department of Electrical Engineering and Computer Science, University of Michigan, Ann Arbor, MI 48109. 2013. pp. 1-6.

Wikipedia. "Levenshtein distance" Downloaded on Oct. 10, 2017 from https://en.wikipedia.org/wiki/Levenshtein_distance. pp. 1-6.

Wikipedia. "Needleman-Wunsch Algorithm" Downloaded on Oct. 10, 2017 from https://en.wikipedia.org/wiki/Needleman%E2%80%93Wunsch_algorithm. pp. 2-8.

Sellers, Peter H. "The Theory and Computation of Evolutionary Distances: Pattern Recognition." *Journal of Algorithms.* vol. 1, 1980. pp. 359-373.

Wikipedia. "Smith-Waterman Algorithm" Downloaded on Oct. 10, 2017 from https://en.wikipedia.org/wiki/Smith%E2%80%93Waterman_algorithm. pp. 1-8.

\* cited by examiner

RUN-TIME SECURITY PROTECTION SYSTEM AND METHOD

BACKGROUND OF THE INVENTION

Field of the Invention

The present disclosure relates to hardware security protection, and more particularly to run-time security protection that indicates anomalous behavior during operation that can compromise security, that identifies relative severity level, and that adjusts to hardware feedback and low risk deviations to improve response.

Description of the Related Art

It is desired to ensure that hardware implementations or devices are secure. It is possible, however, that there may be an unidentified scenario that would enable an un-accredited user to gain access to secure areas of the system. Conventional techniques are generally directed to known, anticipated and/or identified scenarios.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

The present inventors have recognized the need for a run-time mechanism that can protect the electronic device from usage that would expose its vulnerability. They have therefore developed supplemental hardware, referred to as a SPS (security protection system), that monitors operation of the device hardware. The SPS includes memory that stores a hardware behavioral model that captures the essence of information accumulated and learned during off-line security validation. The SPS includes a vetting system that monitors security critical signals during run-time operation of the device and that compares run-time operation of the device with the behavioral model. In the event of anomalous or unexpected behavior based on the model, the vetting system asserts a flag (or provides any other suitable indication) and indicates relative severity of the behavior from a security standpoint. The vetting system also activates a synchronization system, which attempts to re-synchronize the model with the device hardware while recording anomalous states as potential model changes that may make the exhibited behavior valid. If stabilization is not achieved, another indication may be provided denoting that the model should be updated. Once stabilized, the synchronization system prompts the vetting system to continue operation and prompts activation of a learning system. When prompted, the learning system monitors feedback from the device hardware in response to the indicated (e.g., flagged) activity and may update the model state machine based on the feedback. Furthermore, if the deviation is deemed low risk, then the learning system may update the model with state information stored by the synchronization system.

Figure 1:
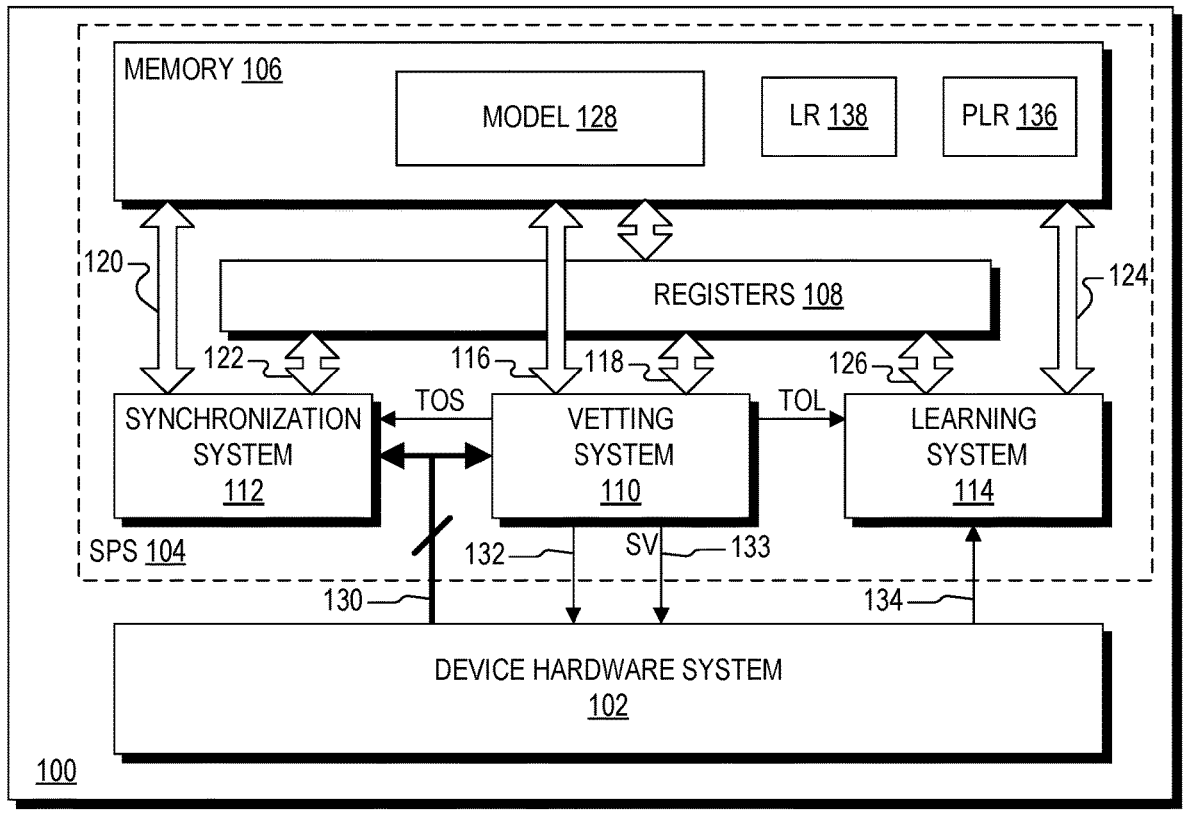
FIG. 1 is simplified block diagram of a processing system including a security protection system implemented according to an embodiment of the present invention.

FIG. 1 is simplified block diagram of a processing system 100 including a security protection system (SPS) 104 implemented according to an embodiment of the present invention. Although the SPS 104 is illustrated for use within a processing system (e.g., 100), the SPS 104 may also provide security for other types of circuits. The processing system 100 includes a device hardware system 102 and the SPS 104. The device hardware system 102 and the SPS 104 of the processing system 100 may be implemented on a semiconductor chip or integrated circuit (IC) or the like, although discrete configurations are also contemplated. The device hardware system 102 is essentially any hardware implementation or configuration in which it is desired to provide run-time security protection. The device hardware system 102 may be, for example, a control module or even an input/output (I/O) module of an Internet of Things (IoT) device. The device hardware system 102 may incorporate a processor or micro-controller or the like (not shown) and may further include memory (not shown) and/or I/O logic (not shown) and the like. The particular configuration, operation or function of the device hardware system 102 is not further described other than cooperating with the SPS 104 for providing security protection in the event of abnormal behavior, in which abnormal behavior is intended to mean unexpected or unpredicted behavior.

The SPS 104 includes a memory 106, a set of registers 108, a vetting system 110, a synchronization system 112, and a learning system 114. It is noted that the registers 108 may be considered part of the memory 106, which may incorporate multiple and/or different types of memory circuits. Each of the systems of the SPS 104 communicate with the memory 106 and the registers 108 via a set of busses, each including one or more individual signals. Each bus is represented as a bidirectional bus, although each bus may include any combination of bidirectional or unidirectional signals or may be entirely unidirectional. The vetting system 110 communicates with the memory 106 and the registers 108 via buses 116 and 118, respectively, the synchronization system 112 communicates with the memory 106 and the registers 108 via buses 120 and 122, respectively, and the learning system 114 communicates with the memory 106 and the registers 108 via buses 124 and 126, respectively. The memory 106 stores a behavioral model 128 representing dynamic operation of the device hardware system 102 from a security standpoint as further described herein. The memory 106 also stores a preliminary learning record (PLR) 136 and a learning record (LR) 138 as further described herein. The PLR 136 is shown and described as being stored in the memory 106, in which the PLR 136 may be stored in the registers 108 to achieve reduced latency.

The security critical signals 130 of the device hardware system 102 are provided to the vetting system 110 and the synchronization system 112 during run-time of the device hardware system 102, meaning, during its normal operating process. The security critical signals 130 are a selected subset of the entire set of signals of the device hardware system 102, in which the selected subset includes those signals that have been determined to be important or even critical to security as further described herein. Driven by a change in one or more of the security critical signals 130, the vetting system 110 reads a current state stored in the registers 108, fetches one or more "vetted" next states from the model 128, and indicates discrepancies when the exhibited behavior does not match the vetted behavior. It is noted that the discrepancy indication (e.g., asserting a flag or the like) may be temporarily paused during short bursts of discrepancies to accommodate resynchronization.

A "vetted" state or state transition means a transition from a current state to a subsequent or next state that is expected or predicted by the model 128 based on previously extracted behavior as further described herein. The security critical signals 130 are a selected subset of the set of signals of the device hardware system 102, and the vetted states are a selected subset of all possible combinations of the security critical signals 130 stored in the model 128. A "real" state or state transition generally refers to states and transitions of the device hardware system 102 during run-time. During such real states and state transitions of the device hardware system 102, the SPS 104 monitors the states and state transitions of the security critical signals 130 and compares them with vetted operation. Since the vetted states do not include all possible combinations of the security critical signals 130, deviations may occur in which the security critical signals 130 transition to non-vetted states that are not stored in the model 128.

When the vetting system 110 identifies a significant discrepancy, it asserts a flag 132 to the device hardware system 102 along with a severity level (SV) value 133. A flag (e.g., the flag 132) is a useful mechanism in the illustrated embodiment for indicating the discrepancy, although any other suitable indication may be used. The flag 132 may include a single flag bit or the like detected by the device hardware system 102 in the form of an interrupt or the like. Although the SV value 133 is shown as a separate value, in another embodiment the flag 132 may incorporate the SV value 133. The severity level is generally based on a predetermined risk level of the device hardware system 102 in the state upon which the anomaly was flagged. Such risk may be based on multiple factors, such as, for example, a relative vulnerability of sensitive data being exposed to external systems or devices. In one embodiment, the vetting system 110 asserts a turn on sync (TOS) signal to activate the synchronization system 112 and a turn on learning (TOL) signal to activate the learning system 114. It is noted that in an alternative embodiment, the TOL signal may be asserted by another component such as the synchronization system 112. The synchronization system 112 updates the PLR 136 during the synchronization process, and the learning system 114 reviews the PLR 136, updates the LR 138 with any new set(s) of state transitions, and may update the model 128 as further described herein.

In response to the flag 132, the device hardware system 102 receives the SV value 133 and executes a handler routine or the like, such as, for example, an interrupt handler routine, determines the appropriate response to be performed, and provides feedback 134 via one or more feedback signals. The interrupt handler routine evaluates current hardware behavior in relation to the identified severity level and takes the appropriate response. The response may simply be an adjustment of the severity level, such as a decrease in the severity level if the behavior is according to normal operating procedure or the like, or possibly even an increase in the severity level under certain conditions. The response by the device hardware system 102 may include mitigating measures depending upon the actual threat to security, such as altering or adjusting its response in the event of a repeated occurrence, resetting the system, or possibly even shutting down the system. The feedback 134 indicates how the device hardware system 102 responded to the flag 132 and the relative consequences of the flagged deviation. The feedback 134 may indicate an adjustment to the model 128 including, for example, an adjustment in the severity level associated with the deviation.

When activated by the TOS signal, the synchronization system 112 attempts to resynchronize vetted operations from the model 128 with the behavior of the device hardware system 102 as indicated by transitions of the security critical signals 130. The synchronization system 112 records changes of the security critical signals 130, reviews the model 128 for next states that are consistent with the current recorded behavior of the device hardware system 102, and identifies when the actual state of the device hardware system 102 matches a known model state. When the actual transitions of the device hardware system 102 follow the expected model states, such as when the device hardware system 102 follows a predetermined number of vetted states in vetted order, then the synchronization system 112 determines that stability has been achieved. When there is sufficient evidence of stability, then the synchronization system 112 indicates that operation is synchronized and stable. During the process of synchronization, new states are recorded into the PLR 136 in the memory 106 for review by the learning system 114.

When activated by the TOL signal, the learning system 114 records the state in which the discrepancy was flagged by the vetting system 110, monitors the feedback 134 from the device hardware system 102, determines whether to update the model 128, and if so, updates the model 128 accordingly. The feedback 134 indicates the effect of the discrepancy on the device hardware system 102, and the learning system 114 may adjust the model 128 accordingly. For example, the feedback 134 may indicate an adjustment of the severity level associated with the state from which the deviation occurred. The learning system 114 compares any newly added set(s) of state transitions in the PLR 136 with previously learned sets of state transitions in the LR 138. The phrase "set of state transitions" is intended to refer to a list of the states in the order in which they occurred. When the newly learned set of state transitions have not been seen before, then they are transferred to the LR 138. When a learned set of state transitions have been encountered a programmable number of times and if the corresponding severity level is relatively low, then the learning system 114 may update the model 128 with the repeated set of state transitions from the LR 138. In this manner, repeated set of state transitions may become part of the vetted transitions incorporated into the model 128.

Figure 2:
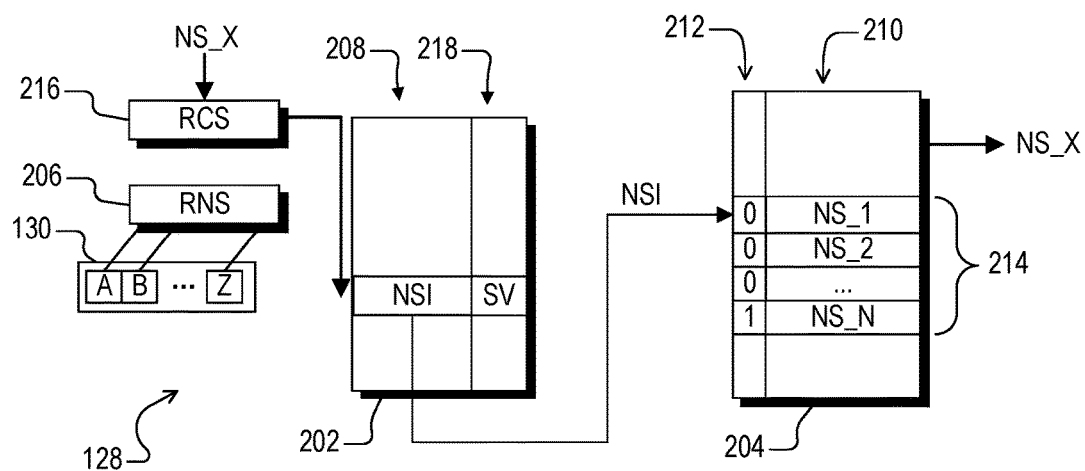
FIG. 2 is a simplified block diagram illustrating how the model of FIG. 1 may be stored within memory according to one embodiment of the present invention.

FIG. 2 is a simplified block diagram illustrating how the model 128 may be stored within the memory 106 according to one embodiment of the present invention. The model 128 includes a lookup table 202 and a table of next states 204. Each actual or "real" state of the device hardware system 102 is represented as a concatenation of the security critical signals 130. When the device hardware system 102 transitions from a real current state (RCS) to a real next state (RNS), the RNS value is stored in a register 206 of the set of registers 108. Another register 216 stores an RCS value representing the current state. The RCS value is used as an index into the lookup table 202 to access a corresponding next state index (NSI) from a list of next state indexes 208. The next state index (NSI) is used as an index into the table of next states 204 to access a sequential list of vetted next state records. Each record in the table of next states 204 includes a next state value 210 and a stop (ST) value 212. Each next state value 210 is also represented as a concatenation of the security critical signals 130 similar to the RCS and RNS values, and each ST value 212 may be one or more stop bits or the like indicating the last value in a corresponding list of vetted next states.

As shown, for example, NSI accesses a list of vetted next states 214 for the current state RCS stored in the register 216, in which the list of vetted next states 214 includes N next states, individually shown as NS_1, NS_2, ..., NS_N (in which "N" is an integer greater than zero). Each vetted next value may be represented as a next state value NS_X, in which "X" is an index from 1 to N. The ST value 212 for each of the next states other than the last next state in the list of vetted next states 214 (e.g., next states NS_1 to NS_N-1) indicates that additional records exist, whereas the ST value 212 for the last entry of the list indicates that it is the last next state in the current list of vetted next states. In one embodiment, for example, the ST value 212 may be a logic zero (0) value for each entry other than the last entry, and the ST value 212 may be a logic one (1) value for the last next state NS_N.

As further described herein, the vetting system 110 performs the vetting process in which it compares the RNS value stored in the register 206 with each next state value 210 of the list of vetted next states 214 to determine whether or not operation of the device hardware system 102 is vetted. In the illustrated configuration, each of the next state values 210 in the list of vetted next states 214, output as NS_X from the table of next states 204, is compared with the RNS value, one at a time in sequential order, until either a match is found or until the ST value 212 indicates the last vetted next state. When the current RNS value matches NS_X, then RNS is considered vetted by the vetting system 110, then NS_X is stored as the RCS value in the register 216 and the next RNS value is vetted in similar manner. If the RNS value is not vetted, meaning that it does not match any of the expected or vetted next states NS_X, then remedial action may be taken and any additional RNS and RCS values may be determined based on actual operation as described further herein.

In the illustrated embodiment, each entry in the lookup table 202 may include an SV value 218 that corresponds with each of the current state values RCS. As shown, for example, the entry storing NSI includes a corresponding SV value 218 which denotes the relative severity in the event of deviation from the real current state represented by the RCS value. The SV value 218 may be a binary value with multiple bits indicating a number associated with the severity level. As a simple example, the SV value 218 may include 2 bits in which a binary value of 00b denotes a null entry or a non-entry, 01b denotes a low severity level, 10b denotes a middle severity level, and 11b denotes a high severity level. An entry of 00b may be used to detect new or non-vetted states as further described herein. Additional bits may be included if it is desired to define additional severity levels. In the event of deviation from the current state RCS and a decision by the vetting system 110 to assert the flag 132, the RCS value may be used as an index into the lookup table 202 to retrieve the corresponding SV value 218, which is provided to the device hardware system 102 as the SV value 133 along with the flag 132. In an alternative embodiment, when the RCS value is initially used to access NSI, the corresponding SV value 218 is also retrieved and stored in another register (not shown) and provided as the SV value 133 in the event of assertion of the flag 132.

Figure 3:
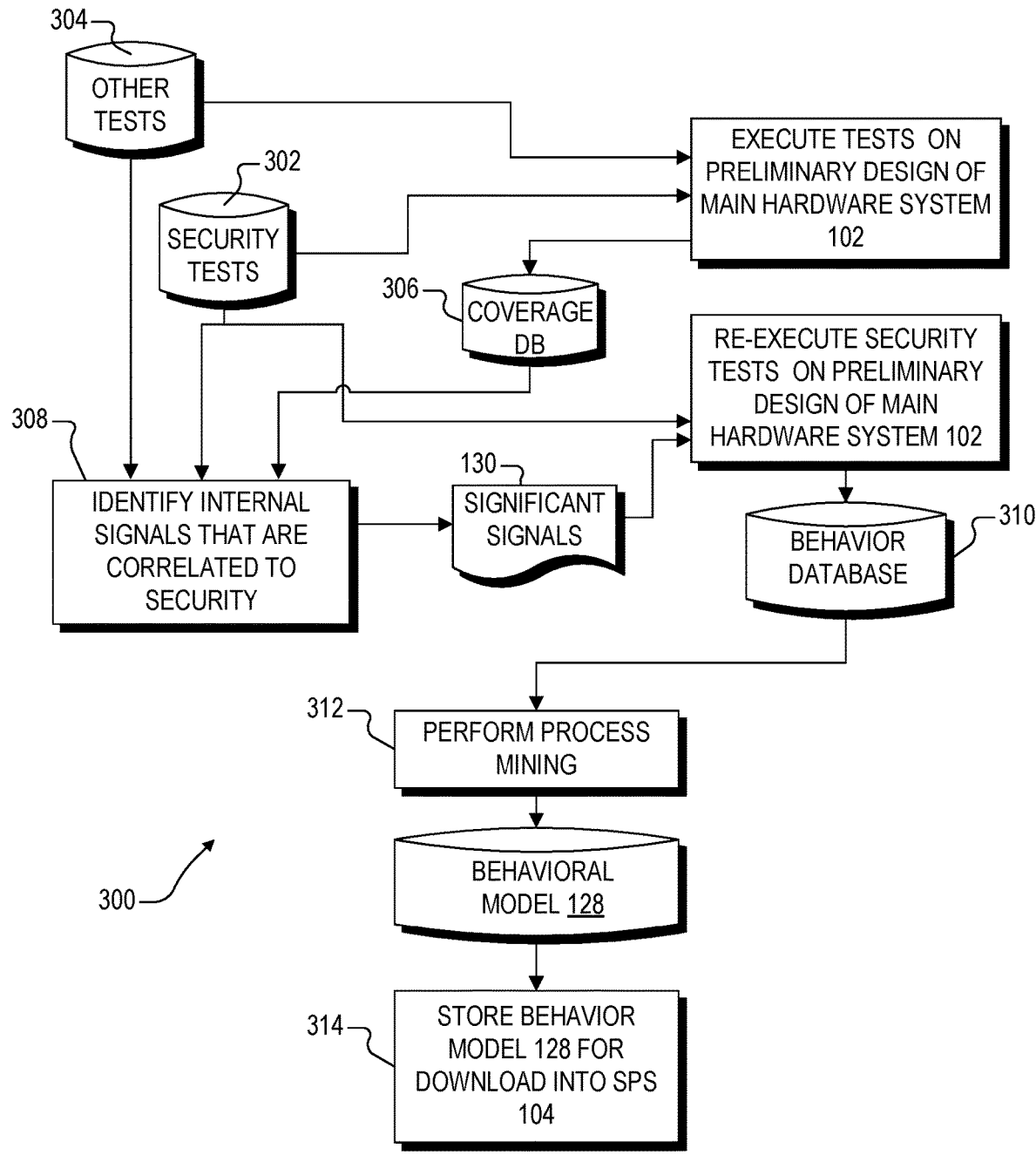
FIG. 3 is a block diagram of an offline process that may be used to generate the model of FIG. 1 according to one embodiment of the present invention.

FIG. 3 is a block diagram of an offline process 300 that may be used to generate the model 128 according to one embodiment of the present invention. The model 128 may be viewed as a finite state machine (FSM) or the like that is an abstraction of vetted executions. State transitions are based on changes of the security critical signals 130 during runtime of the device hardware system 102. The security critical signals 130 are selected as a subset of the complete set of signals of the device hardware system 102, and the model 128 is created offline as a collection of selected states and state transitions of the security critical signals 130, and then ultimately downloaded into the memory 106. The offline process 300 is performed during the design phase when the device hardware system 102 is in a preliminary phase before being solidified in silicon.

The offline process 300 begins by executing several sets of tests, including, for example, security specific tests 302 among other more general purpose tests 304, on the preliminary design of the device hardware system 102 and gathering coverage data into a coverage database (DB) 306. At block 308, data mining algorithms or the like are employed using information in the coverage DB 306 to identify correlations between security relevant tests and internal signals of the preliminary design of the device hardware system 102, and those internal signals that are highly correlated as relevant to security are identified as the security critical signals 130. Then the security relevant tests 302 are executed again on the preliminary design of the device hardware system 102 in which only the security critical signals 130 are used to record the behavioral events in time into a behavior database 310. It is noted that execution of the tests on the preliminary design may be considered simulations or emulations since the main hardware system 102 is not in its final version. Then process mining techniques are performed at 312 to process the behavior database 310 to create the behavioral model 128. At 314, the behavioral model 128 is stored and ultimately downloaded to the memory 106 of the SPS 104.

Figure 4:
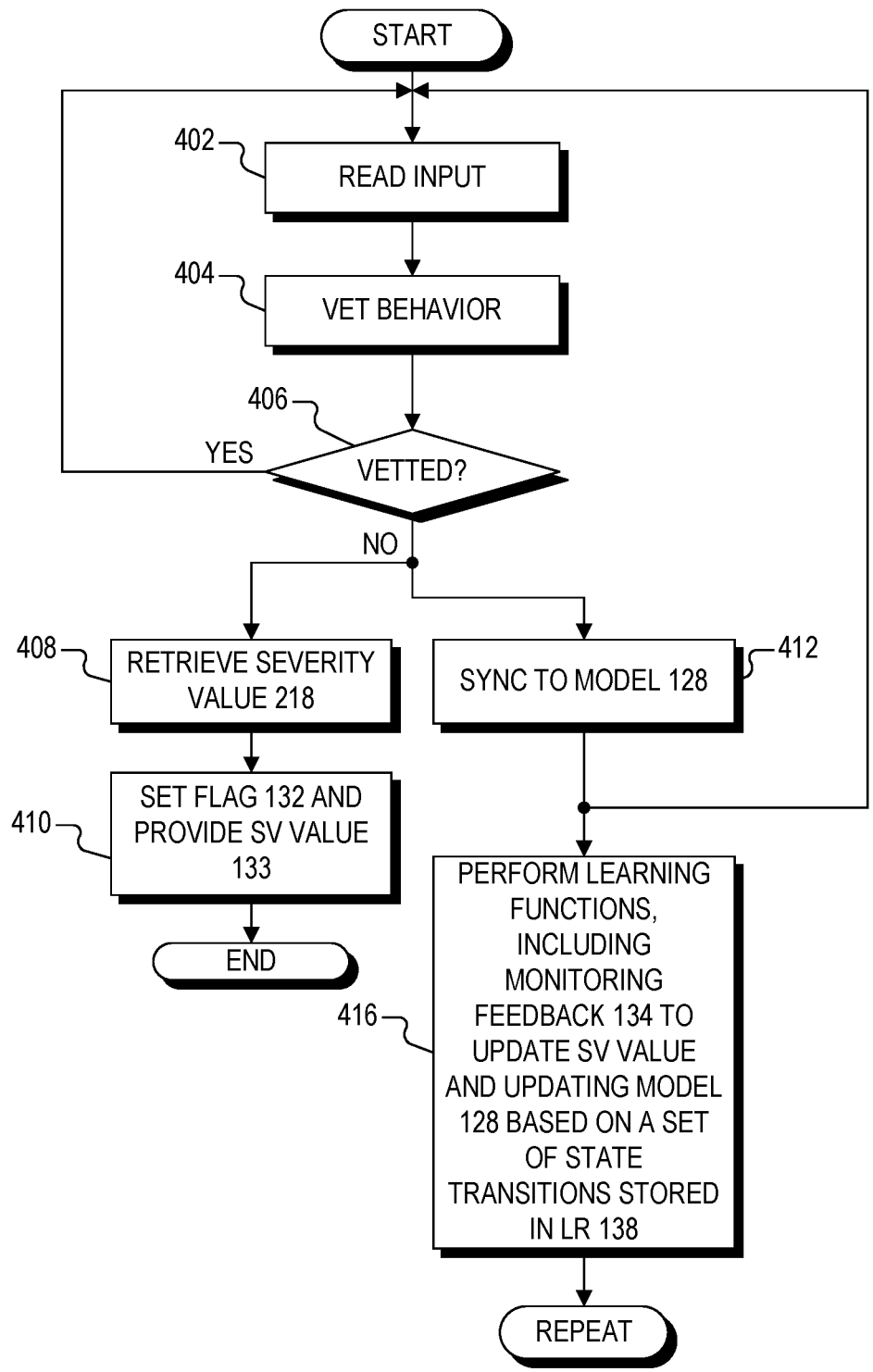
FIG. 4 is a flowchart diagram illustrating overall operation of the security protection system of FIG. 1 during run-time operation of the device hardware system according to one embodiment of the present invention.

FIG. 4 is a flowchart diagram illustrating overall operation of the SPS 104 during run-time operation of the device hardware system 102 according to one embodiment of the present invention. At first block 402 the security critical signals 130 are read or latched into the SPS 104, such as into the register 206 as the new RNS value. The prior RNS value, assuming it was vetted, is transferred into the register 216 as the current state value RCS. At next block 404, the vetting system 110 performs the vetting process by comparing the behavior of the device hardware system 102 as represented by the updated security critical signals 130 with the vetted behavior stored in the model 128. The model 128, for example, identifies the vetted next states associated with RCS and the vetting system 110 determines whether RNS matches any of the previously determined vetted states. If the RNS value is vetted as determined at next query block 406, then operation loops back to block 402 to again latch any update of the security critical signals 130 as the new RNS value. Operation loops between blocks 402 and 406 so long as operation of the device hardware system 102 matches the vetted behavior stored in the model 128.

If the security critical signals 130 as represented by the RNS value do not indicate vetted behavior as determined at query block 406, then operation instead advances to blocks 408 and 412. At block 408, the SV value 133 is retrieved or otherwise identified, and then the flag 132 is set and the SV value 133 is provided as the SV value 133 at next block 410. As previously described, the severity level may be provided as a separate value or may be incorporated within the value of the flag 132. In either case, the device hardware system 102 is notified of the discrepancy and the potential severity of the deviation. Meanwhile, the vetting system 110 asserts the TOS signal to activate the synchronization system 112, which attempts to resynchronize vetted operations from the model 128 with the behavior of the device hardware system 102 at block 412. The new set of state transitions is stored in the PLR 136 until synchronization is achieved, such as when a known state is encountered followed by additional sequential vetted states. It is noted that if synchronization is not achieved within a predetermined time period or number of states or transitions, then the synchronization system 112 may take remedial action, such as corrective action and/or notification.

Upon synchronization, the vetting system 110 asserts the TOL signal to activate the learning system 114, which performs several learning functions as further described herein. Such learning functions include, for example, monitoring the feedback 134 from the device hardware system 102 for updating a severity level value SV of the state in which the discrepancy was flagged by the vetting system 110. The learning functions may also include monitoring information in the PLR 136 and the LR 138 and updating the model 128 based on a set of state transitions stored in the LR 138 as further described herein.

Figure 5:
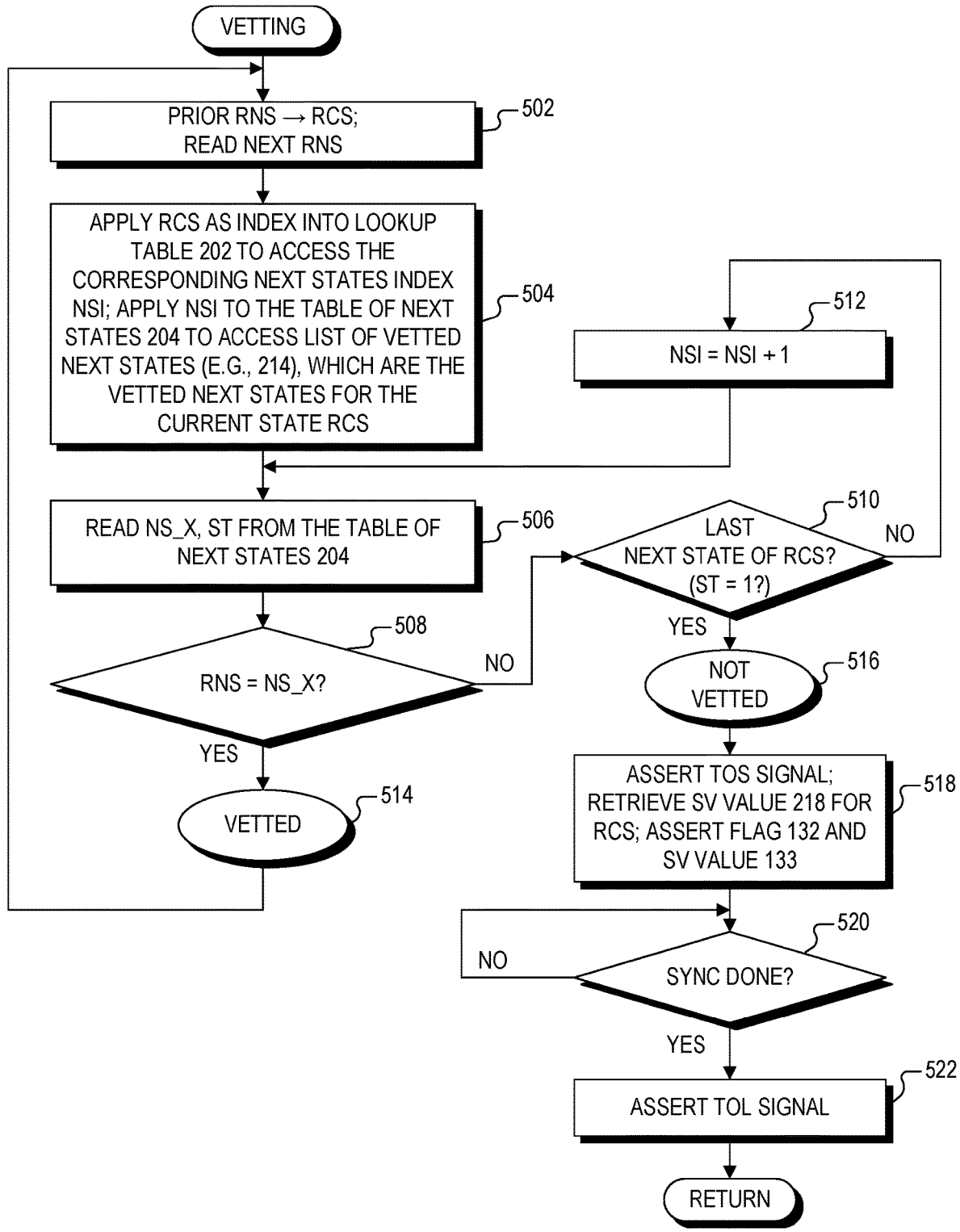
FIG. 5 is a flowchart diagram illustration operation of the vetting system of FIG. 1 according to one embodiment of the present invention.

FIG. 5 is a flowchart diagram illustrating operation of the vetting system 110 (as represented at blocks 402, 404 and 406 in FIG. 4) according to one embodiment of the present invention. At first block 502, the previous RNS, if any, is copied from register 206 into register 216 as the current state RCS, and the new RNS value for the next state is stored in the register 206. Operation then advances to block 504 in which the RCS value is applied as an index to the lookup table 202 to retrieve the corresponding next state index value NSI, and NSI is applied to the table of next states 204 to access the list of vetted next states (for example, list of vetted next states 214) for the current state RCS from the table of next states 204. At next block 506, the vetting system 110 retrieves the next state value 210 and the corresponding ST value 212 in the first record of the accessed list in the table of next states 204. The next state value read at block 506 is shown as NS_X, in which "X" is "1" in the first iteration. At next block 508, it is queried whether the next state RNS is equal to the next state value NS_X (e.g., NS_1 for the first iteration) retrieved from the table of next states 204. If not, operation proceeds to inquiry block 510 to determine whether NS_X is the last next state for the current state, which is true if the retrieved ST value 212 is equal to one (1). If the ST value 212 is not equal to one, the operation advances to block 512 to increment NSI to access the next NS_X value from the table of next state 204 (e.g., NS_2 in the next iteration) then operation loops back to block 506 in order to test any additional next state values in the access list of vetted next states. Operation loops between blocks 506, 508, 510 and 512 to compare RNS with each vetted next state for RCS.

If RNS equals any of the next vetted states NS_X as determined at block 508, then the real next state RNS is vetted as indicated at 514, and operation loops back to block 502 to update RCS as the current RNS value and to read the next RNS value. Operation repeats in this manner and loops between blocks 502 and 514 for vetted operation.

Referring back to block 510, if the ST value 212 is equal to 1 and RNS did not match any of the vetted next states retrieved from the table of next states 204, then operation of the device hardware system 102 is not vetted as indicated at 516 and the vetting system 110 instead advances to block 518 in which the vetting system 110 asserts the TOS signal to activate the synchronization system 112. The vetting system 110 also retrieves the SV value 218 for RCS from the lookup table 208, and asserts the flag 132 and the SV value 133 using the retrieved SV value 218. At next block 520, the vetting system 110 waits until resynchronization is achieved as indicated by assertion of the SYNC DONE signal before returning back to the vetting procedure. When SYNC DONE is asserted (or when TRUE), operation advances to block 522 in which the vetting system 110 asserts the TOL signal to activate the learning system 114. When activated, the learning system 114 reads the feedback 134 from the device hardware system 102 and reviews the set of state transitions in the PLR 136 and the LR 138 and may update the model 128 accordingly as further described herein. The vetting system 110 then returns to normal vetting operation.

Figure 6:
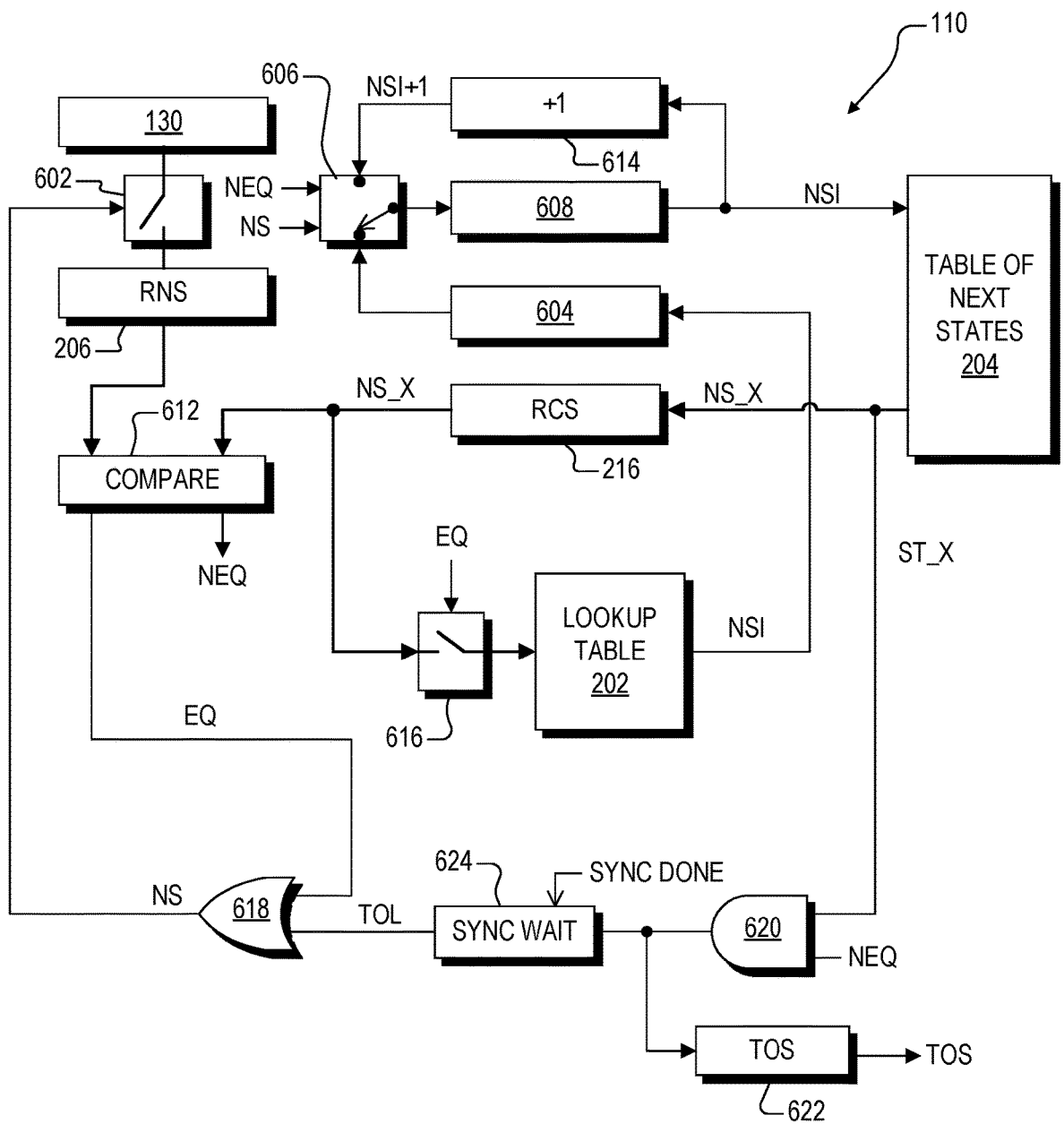
FIG. 6 is a simplified block diagram of the vetting system of FIG. 1 implemented according to one embodiment of the present invention.

FIG. 6 is a simplified block diagram of the vetting system 110 implemented according to one embodiment of the present invention. The current state value RCS stored in the register 216 is shown output as NS_X, which is applied through a switch 616 as an index to the lookup table 202. The lookup table 202 outputs a corresponding next state index value NSI, which is stored into a register 604. Meanwhile, in response to a next state signal NS, the security critical signals 130 are latched via switch 602 into the register 206 as the next state value RNS and applied to one input of a digital comparator 612, and another switch 606 is prompted by NS to latch the index value NSI from the register 604 into another register 608. The index value NSI in register 608 is applied to the table of next states 204 to access the list of vetted next states associated with the current state RCS in the table of next states 204, shown output as NS_X. Each next state value of NS_X in the accessed list from the table of next states 204 is latched into the register 216 and applied to the other input of the comparator 612. If the NS_X value is not equal to the RNS value, then the comparator 612 asserts a not equal value NEQ to the switch 606, which prompts the register 608 to be loaded with the output of an incrementer 614, having its input coupled to the output of the register 608 and its output providing an incremented index NSI+1 back into the register 608. In effect, the value in the register 608 is incremented and applied to the table of next states 204 to access the second next state value NS_X, which is then latched into the register 216 and compared with the RNS value by the comparator 612. This process is repeated to test each of the next state values NS_X in the accessed list of vetted next states from the table of next states 204.

When any one of the next state values NS_X (NS_1 to NS_N) in the accessed list of vetted next states from the table of next states 204 matches the RNS value, then the comparator 612 asserts an equal signal EQ provided to one input of a 2-input logic OR gate 618. The OR gate 618 outputs the NS signal, which prompts the switch 602 to latch the next RNS value into the register 206 and the switch 606 to select the output of the register 604 as the input to the register 608. EQ also prompts the switch 616 to pass the matching NS_X value as an index into the lookup table 202, and the process is repeated for the next state of the device hardware system 102. For each next state value in the accessed list of vetted next states from the table of next states 204, the corresponding ST value 212, shown as ST_X (in which X is incremented from 1 to N as previously described), is applied to one input of a 2-input logic AND gate 620, which receives the NEQ value from the comparator 612 at its other input. As long as the next state value NS_X being tested is not the last in the accessed list of vetted next states, then the output of the AND gate 620 remains low or otherwise not asserted.

When, on the other hand, none of the NS_X values in the accessed list of vetted next states is equal to the RNS value, then NEQ and ST_X are both asserted high, so that the output of the AND gate 620 goes high, and the vetting process for the next real state value RNS fails so that RNS is not a vetted state. When not vetted, then the flag 132 along with the corresponding SV value 133 are provided to the device hardware system 102, and assertion of the output of the AND gate 620 is detected by a TOS circuit 622 and a synchronization wait (SYNC WAIT) block 624. The TOS circuit 622 asserts the TOS signal to activate the synchronization system 112. The synchronization wait block 624 waits until the synchronization system 112 resynchronizes operation between the SPS 104 and the device hardware system 102 as indicated by assertion of the SYNC DONE signal. When the SYNC DONE signal is asserted, the synchronization wait block 624 asserts the TOL signal to activate the learning system 114. The TOL signal may be provided to the other input of the OR gate 618, which asserts NS to trigger the switch 602 to read the next RNS value so that operations may resume.

Figure 7:
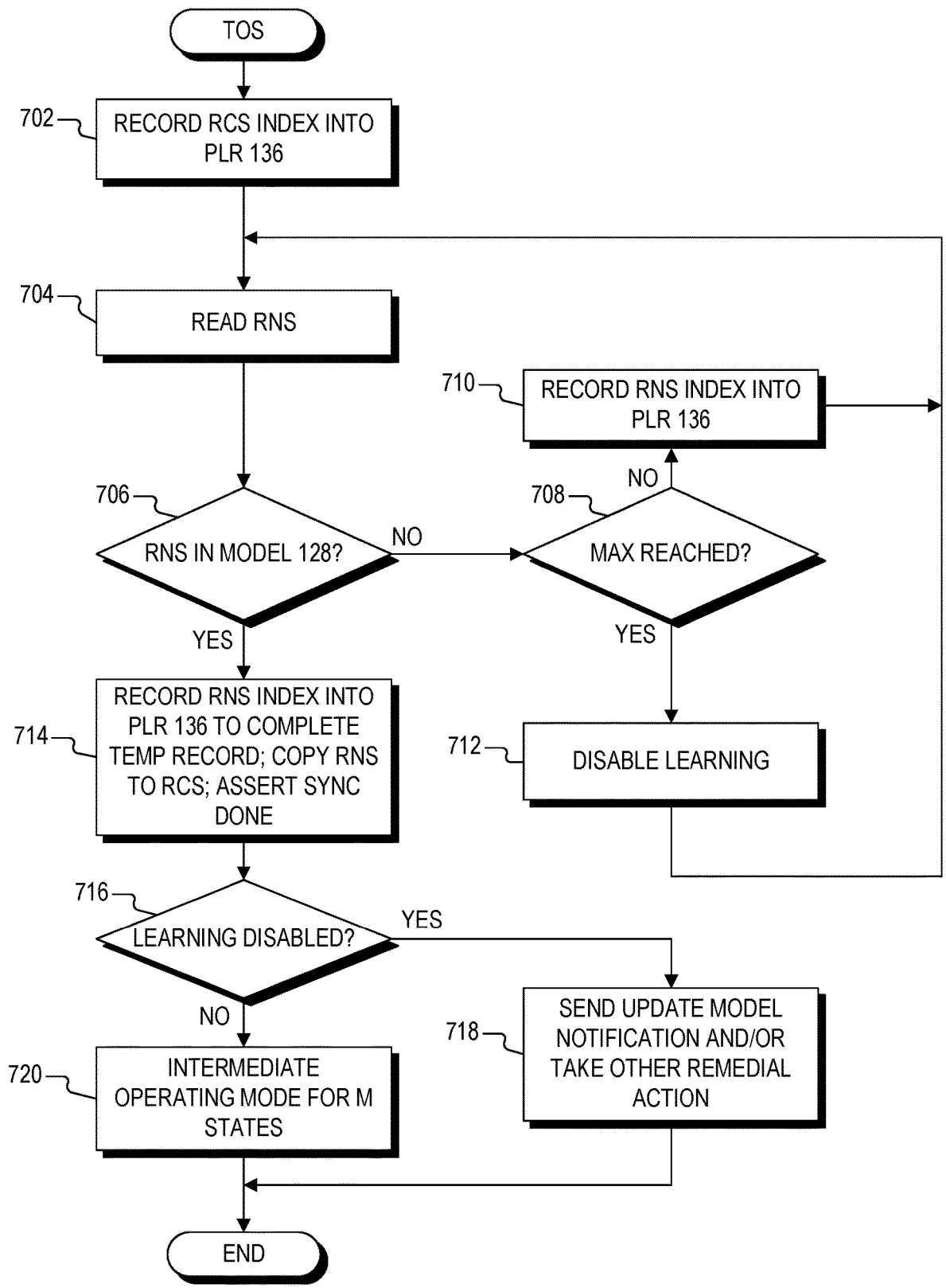
FIG. 7 is a simplified flowchart diagram illustrating operation of the synchronization system of FIG. 1 according to one embodiment of the present invention.

FIG. 7 is a simplified flowchart diagram illustrating operation of the synchronization system 112 according to one embodiment of the present invention. In response to assertion of the TOS signal, the synchronization system 112 records the index of the current state RCS stored in the register 604 as a first entry of the PLR 136. RCS is the last vetted state before a non-vetted state not currently in the model 128 was detected. Operation advances to block 704 in which the real next state RNS is read, which is currently stored in the register 206. At next block 706 it is queried whether RNS is found in the model 128. It is noted that not all combinations of the security critical signals 130 are defined as corresponding states in the model 128. If RNS is not found in the model 128, then operation proceeds to block 708 to query whether a maximum (MAX) number of newly learned states and corresponding transitions recorded in the PLR 136 has been reached. The memory 106 and/or each of the records 136 and 138 have a finite limit in which MAX may prevent an undesired overflow. Also, if the number of new states becomes excessive such that MAX is reached, then the model 128 may be obsolete and should be replaced. If MAX is not yet reached, then operation proceeds to block 710 in which the synchronization system 112 records the RNS value as the next entry of the PLR 136. Operation then loops back to block 704 to read the next RNS value when updated by the device hardware system 102. Operation loops between blocks 704, 706, 708, and 710 to store a current set of state transitions until MAX is reached or until RNS is found in the model 128.

In the event MAX is reached at block 708, then operation instead advances to block 712 in which learning is disabled. Operation then loops back to block 704 to read the next RNS value when updated by the device hardware system 102. Once learning is disabled, operation may loop between blocks 704, 706, 708, and 712 (bypassing block 710) until RNS is found in the model 128 or until other remedial action is taken. It is noted that if MAX has been reached so that learning is disabled, then the model 128 may be obsolete and should be replaced.

Referring back to block 706, if the RNS is found in the model 128, operation instead advances to block 714 in which the RNS index is recorded as the last value in PLR 136 and the current temporary record is completed. Also, the RNS value is stored as the RCS value in the register 216 and the SYNC DONE signal is asserted to restart the vetting system 110. Operation then advances to block 716 in which it is queried whether learning has been disabled. If so, then operation advances to block 718 in which an update model notification is sent, such as to the device hardware system 102, which may then take other remedial action, and operation is completed. It is noted that the SPS 104 may, in addition or the alternative, take remedial action, such as resetting or shutting down the system depending upon the particular configuration.

If instead learning has not been disabled as determined at block 716, then operation advances to block 720 in which an intermediate operating mode is initialized for "M" states. M is an integer greater than 0 used for purposes of verifying synchronization, in which M may be a programmed value. The transition from resynchronization to vetting may be based on detecting only one recognized state as detected at block 706. It is noted, however, that during dynamic operation of the device hardware system 102, the transitional path may be different from the vetted states and transitions even when a common state is encountered. In one embodiment, even though a known state is encountered, the SPS 104 may enter an intermediate operating mode in which the vetting system 110 is restarted without asserting the flag 132 and the SV value 133 until a sufficient number of vetted states have sequentially occurred to verify synchronization. The number of sequential vetted states for verification is the value M. In this manner, if M sequential vetted states occur after return from synchronization, then normal operation resumes. If less than M sequential vetted states occur after return from synchronization so that the synchronization system 112 is once again restarted, then synchronization is not verified. When synchronization is restarted, a new set of state transitions are recorded into the PLR 136 rather than a continuation of the just completed set of state transitions.

Figure 8:
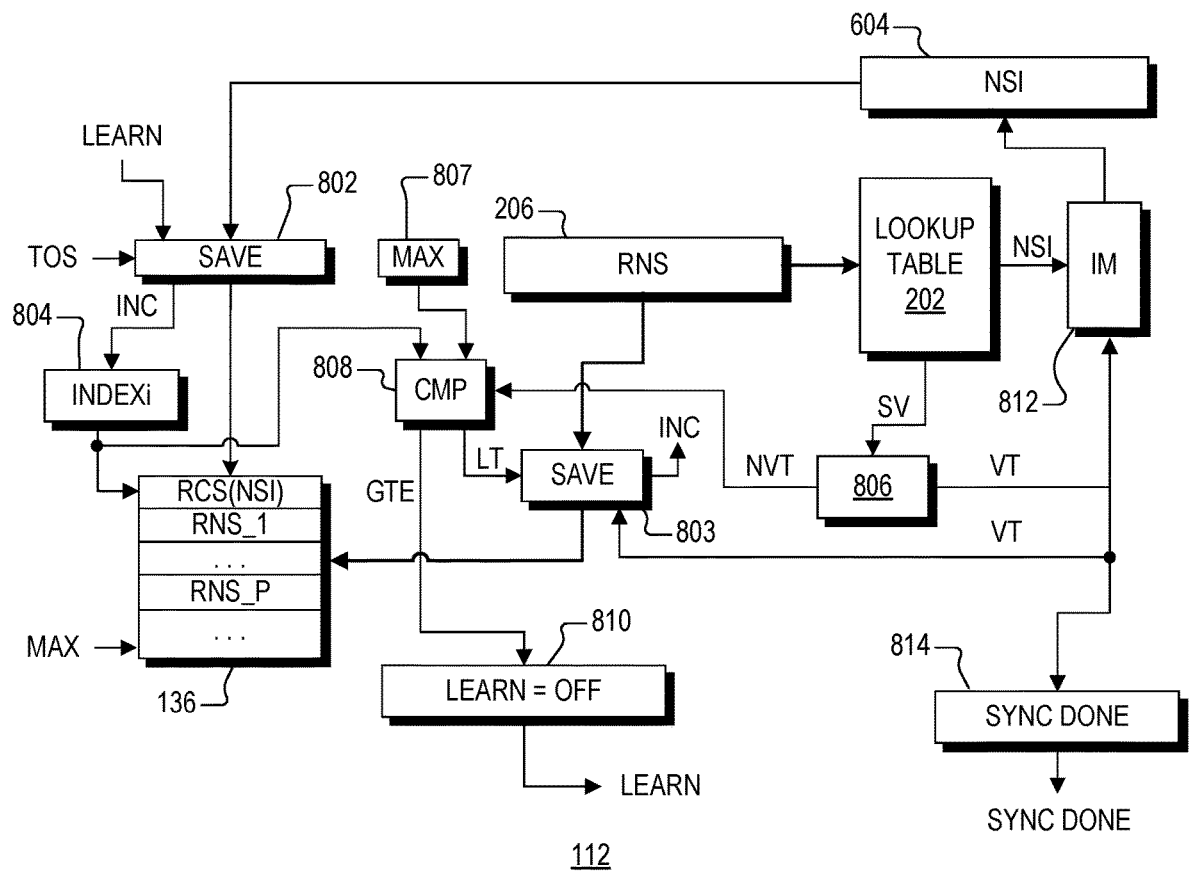
FIG. 8 is a simplified block diagram of the synchronization system of FIG. 1 according to one embodiment of the present invention.

FIG. 8 is a simplified block diagram of the synchronization system 112 according to one embodiment of the present invention. The TOS signal is sensed by a save circuit 802, which causes the index value stored in the register 604 to be stored into the PLR 136 as RCS(NSI) at a location pointed to by an index value INDEXi as long as a value LEARN is ON (or TRUE). INDEXi may be stored in a register 804, and the save circuit 802 asserts an increment signal INC to increment the INDEXi value each time an entry is stored. The RNS value in the register 206 is applied to the lookup table 202 and the corresponding SV value is retrieved and applied to an input of a digital comparator 806 configured to compare SV with a binary zero value. If the SV value is equal to zero (e.g., "00b") as determined by the comparator 806, then the state indicated by RNS is not a vetted state stored within the lookup table 202 so that the comparator 806 asserts a non-vetted signal NVT to prompt another digital comparator 808. The NVT signal prompts the comparator 808 to compare the current value of INDEXi with the MAX value (shown stored in memory or register 807), which is the maximum value of INDEXi pointing to the last allowable entry within the PLR 136. When INDEXi is less than MAX, the comparator 808 outputs a signal LT to prompt a save circuit 803 to store the RNS value into the PLR 136 and to assert the INC signal to increment INDEXi. It is noted that save circuits 802 and 803 may be part of a common save circuit. The first RNS value stored after RCS(NSI) is shown as RNS_1. When INDEXi is greater than or equal to MAX, the comparator 808 outputs a signal GTE to a learn circuit 810, which sets the LEARN value to OFF to disable learning. The LEARN value is provided to the save circuit 802, which prevents further update of the PLR 136 by save circuit 802 and 803 when learning is turned OFF.

While INDEXi is less than MAX and subsequent RNS values are not found in the lookup table 202, the new states are stored into sequential locations of the PLR 136, shown as RNS_1, . . . , RNS_P for a total of "P" RNS values, in which P is an integer of zero or more. Even if MAX is reached, the comparator 806 continues to evaluate whether the new RNS states are in the lookup table 202. When the comparator 806 determines that RNS is in the lookup table 202, it instead asserts a vetted state signal VT provided to an intermediate (IM) circuit 812, to the save circuit 803, and to sync done circuit 814. The save circuit 803 stores the RNS value into the PLR 136 as the last entry RNS_P in the current list of entries and asserts INC. The sync done circuit 814 asserts the SYNC DONE signal to restart the vetting system 110 as previously described. The IM circuit 812 stores an index value NSI retrieved from the lookup table 202 into the register 604, and tracks the TOS signal for the next M cycles while disabling assertion of the flag 132. The IM circuit 812 verifies synchronization and re-enables the flag 132 when the next consecutive M states are vetted states. Otherwise, TOS is re-asserted again and the synchronization system 112 is re-enabled to store a new set of non-vetted states into the PLR 136.

Figure 9:
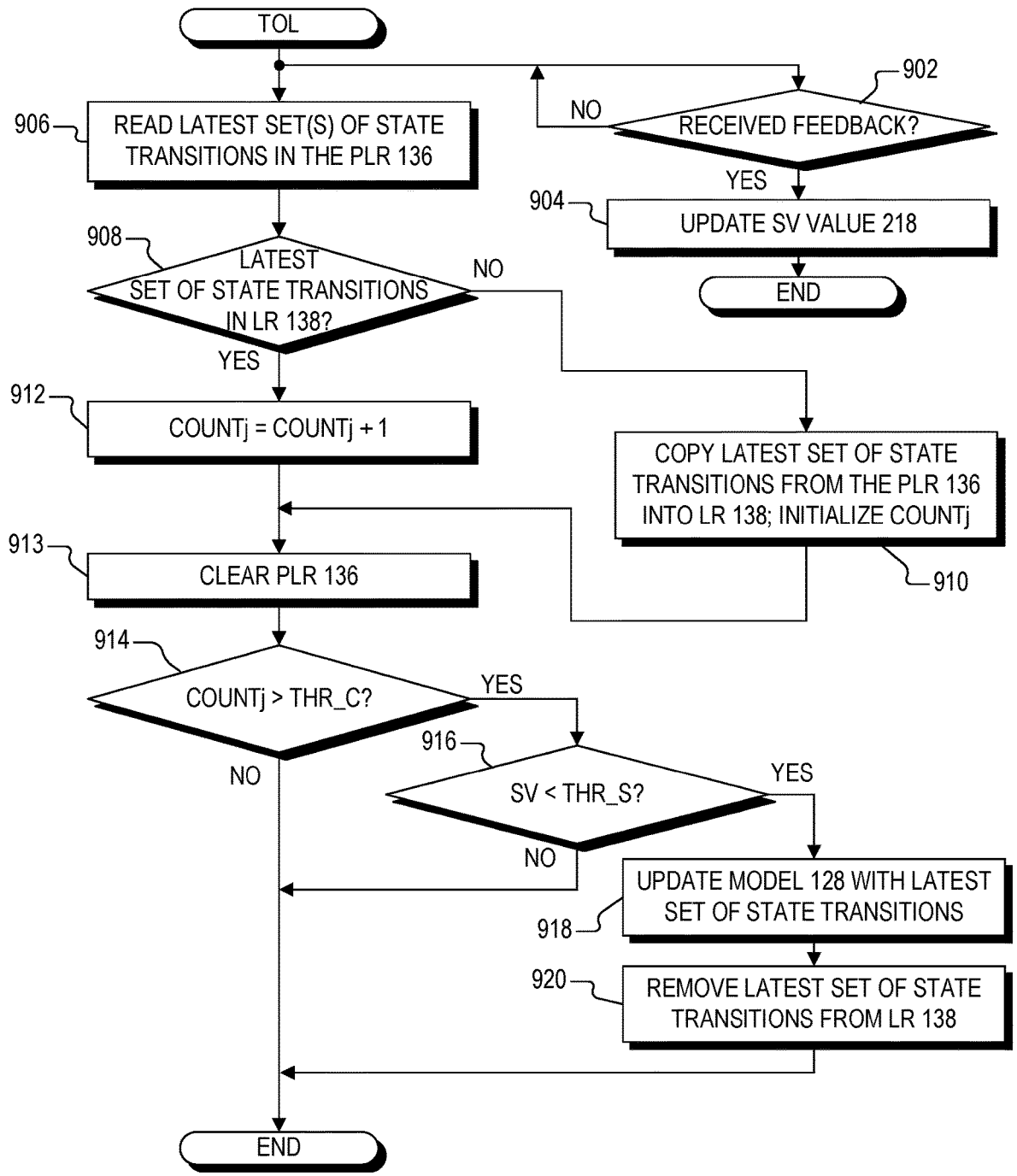
FIG. 9 is a simplified flowchart diagram illustrating operation of the learning system of FIG. 1 according to one embodiment of the present invention.

FIG. 9 is a simplified flowchart diagram illustrating operation of the learning system 114 according to one embodiment of the present invention. In response to assertion of the TOL signal, the learning system 114 is activated and operation proceeds to block 902 in which it is queried whether feedback 134 from the device hardware system 102 has been received. Operation loops at block 902 until feedback 134 is indicated as being provided. When the feedback 134 is provided, operation advances to block 904 in which the learning system 114 updates the SV value 218 in the lookup table 202 corresponding to the last vetted state before synchronization started if indicated by the feedback 134. If updated, the SV value 218 for the last vetted state may be increased or decreased in the lookup table 202 based on the feedback 134. Although not specifically shown, a timeout provision may be provided in the case when feedback 134 is not received for any reason.

In response to assertion of the TOL signal, operation also advances to block 906 in which the latest set(s) of state transitions written by the synchronization system 112 into the PLR 136 is read. It is noted that multiple different sets of state transitions may have been added by the synchronization system 112 since the last learning session in the event that M sequential vetted states did not occur after a first return from synchronization so that multiple synchronization sessions may have occurred. At next block 908, it is queried whether the latest set of state transitions is located in the LR 138. In one embodiment, the learning system 114 may scan the LR 138 to determine whether the latest set of state transitions has previously occurred and has been copied from the PLR 136 into the LR 138. If not already in the LR 138, then operation advances to block 910 in which the latest set of state transitions is copied into the LR 138 from the PLR 136, and a count value, shown as COUNTj, is initialized. It is noted that the separate count value may be stored for each separate list that exists in the LR 138, in which an index value "j" indicates the corresponding count value. If already encountered such that the set of state transitions already exists in the LR 138, then operation advances instead to block 912 in which COUNTj is incremented by one to keep track of the number of times that the set of state transitions has been repeated.

Operation advances to block 913 from either blocks 910 or 912 in which the contents of the PLR 136 are cleared. Operation then advances to block 914 to query whether COUNTj has become greater than a predetermined count threshold THR_C. If so, then operation proceeds to block 916 to query whether the SV value is less than a predetermined severity threshold THR_S. If so, then operation proceeds to block 918 in which the learning system 114 updates the model 128 with the latest set of state transitions that has repeated THR_C number of times (and with severity less than THR_S), and then operation advances to block 920 in which the set of state transitions is removed from the LR 138. If COUNTj is not greater than THR_C (block 914) or if SV is not less than THR_S (block 916), or after the sequence has been deleted from the LR 138 (block 920), operation of the learning system 114 for the current iteration is completed. In summary, if the list of state transitions has been encountered THR_C number of times and has a severity level less than THR_S, then the model 128 is updated with the sequence. Otherwise, the model 128 is not updated with the state transition information.

A run-time security system for vetting operation of device hardware according to one embodiment includes a memory, a vetting system, a synchronization system, and a learning system. The memory stores a model of the device hardware, in which the model stores multiple vetted states based on multiple security signals of the device hardware, and for each vetted state, further stores a severity level value and at least one vetted next state. The vetting system compares a real next state of the device hardware during operation with the at least one vetted next state of a vetted current state, and provides an indication and a corresponding severity level when the real next state does not match any of the at least one vetted next state. In response to the indication, the synchronization system performs synchronization by comparing each of at least one subsequent real next state of the device hardware with the vetted states until initial synchronization occurs when any subsequent real next state matches a vetted state. The learning system receives feedback from the device hardware in response to the indication, and when indicated by the feedback, updates the model in accordance with the feedback.

The indication may be provided in any suitable fashion. In one embodiment, for example, the indication is provided by asserting a flag. In one embodiment, the learning system updates the model by updating the severity level value stored in the model associated with the vetted current state when indicated by the feedback from the device hardware.

The security signals may be determined by running at least one security relevant test on a device hardware design indicative of the device hardware while using data mining algorithms to identify those signals of the device hardware design that correlate with the at least one security relevant test. The model may be determined by re-running the at least one security relevant test while recording states and state transitions of the device hardware design as exhibited by the security signals.

The model may include a lookup table and a table of next states. The lookup table that stores a next state index value and a severity level value for each vetted states. The table of next states stores the at least one vetted next state for each vetted state, in which the table of next states is indexed using a next state index value retrieved from the lookup table.

The synchronization system may enter an intermediate operating mode after initial synchronization to verify synchronization when each of M subsequent consecutive real next states match any one of the vetted states. The vetting system may suppress providing the indication during the intermediate operating mode, and may prompt the synchronization system to reenter synchronization when any one of the M subsequent consecutive real next states does not match any of the vetted states.

The memory may further store a preliminary learning record and a learning record. The synchronization system may further store a set of state transitions into the preliminary learning record for each indication being provided in which each set of state transitions includes at least one new state of the device hardware that is not stored in the model. The learning system may copy each new set of state transitions into the learning record, increment a count value for each duplicate occurrence of an existing set of state transitions, and update the model to include new states within the duplicate occurrence of an existing set of state transitions when the count value reaches a predetermined count threshold. The learning system may update the model only when the duplicate occurrence of an existing set of state transitions is associated with a severity level that is less than a threshold severity level. The synchronization system may stop storing the set of state transitions when the preliminary learning record reaches a maximum storage limit.

A method of providing run-time security for vetting operation of device hardware according to one embodiment includes comparing, by a vetting system, a real next state of the device hardware during operation with the at least one vetted next state of a vetted current state, providing, by the vetting system, an indication and a corresponding severity level when the real next state does not match any of the at least one vetted next state, performing synchronization, by a synchronization system, in response to providing the indication by comparing each of at least one subsequent real next state of the device hardware with the vetted states until initial synchronization occurs when one of the at least one subsequent real next state matches one of the vetted states, and receiving, by a learning system, feedback from the device hardware in response to providing the indication, and when indicated by the feedback, updating the model in accordance with the feedback.

The method may include updating the severity level value stored in the model associated with the vetted current state. The method may include applying the vetted current state as an index into a lookup table and retrieving a corresponding next state index, and applying the corresponding next state index retrieved from the lookup table to the table of next states and retrieving a list of vetted next states for the vetted current state.

The method may include entering an intermediate operating mode after the initial synchronization while verifying synchronization when each of M subsequent consecutive real next states match one of the vetted states. The method may further include suppressing providing the indication during the intermediate operating mode, and prompting the synchronization system to reenter synchronization when any one of the M subsequent consecutive real next states does not match any of the vetted states.

The method may include storing a preliminary learning record stored in the memory, and while performing synchronization, storing each real next state of the device hardware into the preliminary learning record that is not stored in the model. The method may further include storing a preliminary learning record and a learning record in the memory, storing a set of state transitions into the preliminary learning record when each indication is provided in which each set of state transitions includes at least one new state of the device hardware that is not stored in the model while performing synchronization, and copying, by the learning system, each new set of state transitions into the learning record, incrementing a count value for each duplicate occurrence of an existing set of state transitions, and updating the model to include new states within the duplicate occurrence of an existing set of state transitions when the count value reaches a predetermined count threshold.

The method may include updating, by the learning system, the model only when the duplicate occurrence of an existing set of state transitions is associated with a severity level that is less than a threshold severity level. The method may include stopping the storing, by the synchronization system, the set of state transitions into the preliminary learning record when each indication is provided the when the preliminary learning record reaches a maximum storage limit.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A run-time security system for vetting operation of device hardware, comprising:
   a memory that stores a model of the device hardware, wherein said model stores a plurality of vetted states based on a plurality of security signals of the device hardware, and for each of said plurality of vetted states, stores a severity level value and at least one vetted next state of a vetted current state, the each of said plurality of vetted states represents a state in the device hardware where access to certain data is considered secure based on simulation or run-time operation of the device hardware;

a vetting system that compares a real next state of the device hardware during operation with said at least one vetted next state of the vetted current state, and that provides an indication and a corresponding severity level of a plurality of severity levels to the device hardware when said real next state does not match any of said at least one vetted next state, wherein a value of the corresponding severity level indicates a relative vulnerability to the certain data when said real next state does not match any of said at least one vetted next state;

a synchronization system that, in response to said providing the indication and the corresponding severity level, performs synchronization by comparing each of at least one subsequent real next state of the device hardware with said plurality of vetted states until initial synchronization occurs when one of said at least one subsequent real next state matches one of said plurality of vetted states; and a learning system that receives feedback from the device hardware in response to said providing the indication and the corresponding severity level, the feedback indicating mitigation measures taken by the device hardware based on the indication and the corresponding severity level to protect the certain data from the relative vulnerability, and when indicated by said feedback, updates said model in accordance with said feedback and based on the at least one subsequent real next state associated with the initial synchronization, and the learning system in response to determining that a first set of state transitions stored in a preliminary learning record of the memory does not match any of previously learned sets of state transitions stored in a learning record of the memory, stores the first set of state transitions in the learning record and incorporates an indication of a repeated set of state transitions in the learning record into the model, the repeated set of state transitions comprising the first set of state transitions.

2. The run-time security system of claim 1, wherein said learning system updates said severity level value stored in said model associated with said vetted current state when indicated by said feedback from the device hardware.

3. The run-time security system of claim 1, wherein said plurality of security signals are determined by running at least one security relevant test on a device hardware design indicative of the device hardware while using data mining algorithms to identify signals of the device hardware design that correlate with said at least one security relevant test.

4. The run-time security system of claim 3, wherein said model is determined by rerunning said at least one security relevant test while recording states and state transitions of the device hardware design as exhibited by said plurality of security signals.

5. The run-time security system of claim 1, wherein said model comprises:
a lookup table that stores a corresponding one of a plurality of next state index values and a corresponding one of a plurality of severity level values for the each of said plurality of vetted states; and
a table of next states that stores said at least one vetted next state for the each of said plurality of vetted states, wherein said table of next states is indexed using said corresponding one of said plurality of next state index values retrieved from said lookup table.

6. The run-time security system of claim 1, wherein said synchronization system enters an intermediate operating mode after said initial synchronization to verify synchronization when each of a number of subsequent consecutive real next states match one of said plurality of vetted states.

7. The run-time security system of claim 6, wherein said vetting system suppresses providing said indication during said intermediate operating mode, and prompts said synchronization system to reenter synchronization when any one of said number of subsequent consecutive real next states does not match any of said plurality of vetted states.

8. The run-time security system of claim 1, further comprising:
wherein said synchronization system further stores each real next state of the device hardware into said preliminary learning record that is not stored in said model.

9. The run-time security system of claim 1, further comprising:
wherein said synchronization system further stores a set of state transitions into said preliminary learning record for each indication being provided in which said set of state transitions comprises at least one new state of the device hardware that is not stored in said model; and
wherein said learning system copies each new set of state transitions into said learning record, increments a count value for each duplicate occurrence of an existing set of state transitions, and updates said model to include new states within said each duplicate occurrence of the existing set of state transitions when said count value reaches a predetermined count threshold.

10. The run-time security system of claim 9, wherein said learning system updates said model only when said each duplicate occurrence of the existing set of state transitions is associated with a severity level that is less than a threshold severity level.

11. The run-time security system of claim 9, wherein said synchronization system stops storing said set of state transitions into said preliminary learning record for each indication when said preliminary learning record reaches a maximum storage limit.

12. The run-time security system of claim 1, wherein states stored by said model are only the plurality of vetted states, each vetted state defined by only the plurality of security signals of the device hardware.

13. A method of providing run-time security for vetting operation of device hardware, wherein a security protection system is coupled to the device hardware, wherein the security protection system includes a memory, a vetting system, a synchronization system, and a learning system, wherein a model of the device hardware is stored in the memory, wherein the model stores a plurality of vetted states based on a plurality of security signals of the device hardware, and wherein for each of the plurality of vetted states, the model stores a severity level value and at least one vetted next state of a vetted current state, the each of said plurality of vetted states represents a state in the device hardware where access to certain data is considered secure based on simulation or run-time operation of the device hardware;

wherein said method comprises:
comparing, by the vetting system, a real next state of the device hardware during operation with the at least one vetted next state of the vetted current state;
providing, by the vetting system, an indication and a corresponding severity level of a plurality of severity levels to the device hardware when the real next state does not match any of the at least one vetted next state, wherein a value of the corresponding severity level indicates a relative vulnerability to the certain data when said real next state does not match any of said at least one vetted next state;

performing synchronization, by the synchronization system, in response to said providing the indication and the corresponding severity level, by comparing each of at least one subsequent real next state of the device hardware with the plurality of vetted states until initial synchronization occurs when one of the at least one subsequent real next state matches one of the plurality of vetted states; and receiving, by the learning system, feedback from the device hardware in response to said providing the indication and the corresponding severity level, the feedback indicating mitigation measures taken by the device hardware based on the indication and the corresponding severity level to protect the certain data from the relative vulnerability, and when indicated by the feedback, updating the model in accordance with the feedback and based on the at least one subsequent real next state associated with the initial synchronization, and in response to determining, by the learning system, that a first set of state transitions stored in a preliminary learning record of the memory does not match any of previously learned sets of state transitions stored in a learning record of the memory, stores the first set of state transitions in the learning record and incorporates an indication of a repeated set of state transitions in the learning record into the model, the repeated set of state transitions comprising the first set of state transitions.

14. The method of claim 13, wherein said updating the model comprises updating the severity level value stored in the model associated with the vetted current state.

15. The method of claim 13, wherein the model of the device hardware includes a lookup table and a table of next states, wherein the lookup table includes a corresponding one of a plurality of next state index values and a corresponding one of a plurality of severity level values for the each of the plurality of vetted states, wherein the table of next states including at least one vetted next state for the each of the plurality of vetted states, and wherein the method further comprises:

applying the vetted current state as an index into the lookup table and retrieving a corresponding next state index value; and applying the retrieved corresponding next state index value to the table of next states and retrieving a list of vetted next states for the vetted current state.

16. The method of claim 13, further comprising entering an intermediate operating mode after the initial synchronization while verifying synchronization when each of a number of subsequent consecutive real next states match one of the plurality of vetted states.

17. The method of claim 16, further comprising:
suppressing said providing the indication during the intermediate operating mode; and
prompting the synchronization system to reenter synchronization when any one of the number of subsequent consecutive real next states does not match any of the plurality of vetted states.

18. The method of claim 13, further comprising:
during said performing synchronization, storing each real next state of the device hardware into the preliminary learning record that is not stored in the model.

19. The method of claim 13, further comprising:
during said performing synchronization, storing a set of state transitions into the preliminary learning record for each indication being provided in which said set of state transitions comprises at least one new state of the device hardware that is not stored in the model; and
copying, by the learning system, each new set of state transitions into the learning record;
incrementing a count value for each duplicate occurrence of an existing set of state transitions; and
updating the model to include new states within the each duplicate occurrence of the existing set of state transitions when the count value reaches a predetermined count threshold.

20. The method of claim 19, further comprising updating, by the learning system, the model only when the each duplicate occurrence of the existing set of state transitions is associated with a severity level that is less than a threshold severity level.

21. The method of claim 19, further comprising stopping said storing the set of state transitions into the preliminary learning record for each indication being provided when the preliminary learning record reaches a maximum storage limit.

22. The method of claim 13, wherein states stored by the model are only the plurality of vetted states, each vetted state defined by only the plurality of security signals of the device hardware.

* * * * *